Davison & Sasher,
Hay Press.

No. 108,889. Patented Nov. 1, 1870.

Witnesses —
G. S. Coleman
J. G. Clayton

J. Ham Davison & Thomas J. Sasher
By their Attorney
P. F. Reigart

United States Patent Office.

J. HAM. DAVISON AND THOMAS J. SASHER, OF MOUND STATION, ILLINOIS.

Letters Patent No. 108,889, dated November 1, 1870.

IMPROVEMENT IN HAY-PRESSES.

The Schedule referred to in these Letters Patent and making part of the same.

*To all whom it may concern:*

Be it known that we, J. HAM. DAVISON and THOMAS J. SASHER, of Mound Station, Brown county and State of Illinois, have invented an "Improved Hay-Press;" and we do hereby declare the following to be an exact description thereof, reference being had to the accompanying drawing and to the letters of reference marked thereon making a part of this specification, in which—

Figure 3:
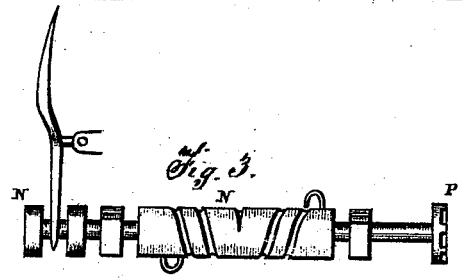

Figure 3 exhibits the windlass that operates the lower levers, with pulleys moving on a guide or horizontal railway-track.

The nature of our invention consists in the construction of the upright press, when arranged with levers, pulley, and railway-track, fastenings, beater, and windlass, combined and operating as herein described; and The object and advantage of our invention are facilities in working the press expeditiously; and, in the operation, having greater power with less draft, while the whole arrangement of the devices are simple, and not liable to be thrown out of gear or put out of order.

To enable others skilled in the art to make and use our invention, we will proceed to describe its construction and operation as follows :

A represents the square upright box-frame, that supports the devices.

B is the square block or beater above, that operates vertically in the square center of the box of the frame A, by means of a rope or chain, C, attached to the upper side of the beater B, and working on a pulley, D, at the top of the machine, thence down and around the lower pulley E, so as to operate the beater B up and down with ease and rapidity.

Figure 1:
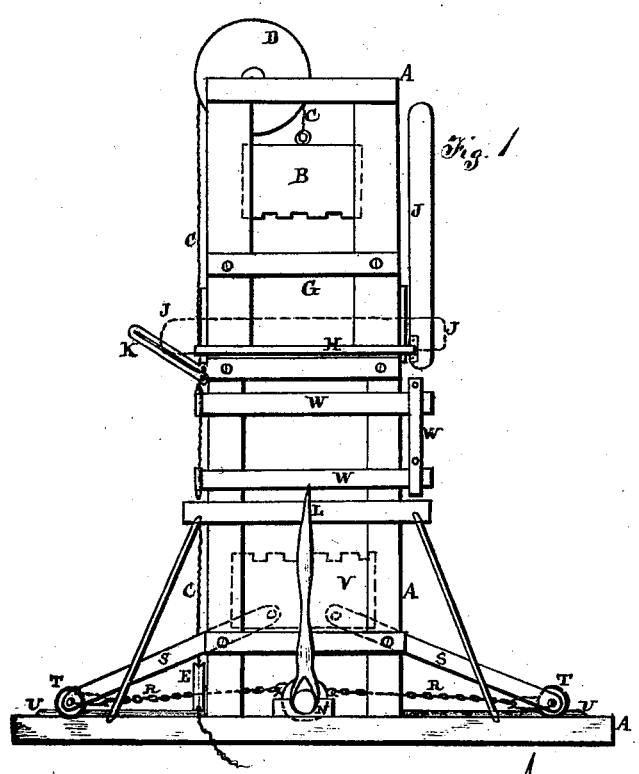
Figure 1 represents a side elevation of the machine.
Figure 2:
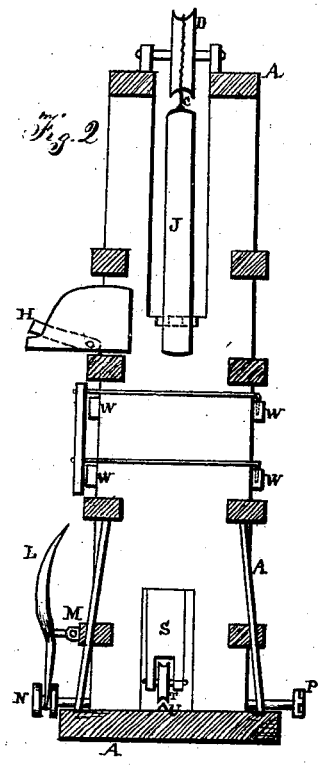
Figure 2 is an end elevation of the same.

The hay being inserted into the square box-frame A at the opening G until the box is filled and the hay is well beaten down by the beater B, the door H is then closed over the opening G, and the hinged upright lever J, at the side of the machine, is then lowered and fastened at the opposite side of the frame by the hinged link or clevis K, the lever J resting upon the top of the beater B, as shown by the dotted lines J at fig. 1.

The adjustable lever L, working on a fulcrum, M, at the side of the machine, and clasping the end of the windlass N, moves the windlass back or forward, so as to throw the shaft in or out of gear with its connection or fellow on the end of a shaft of a horse-power intended to be run at the side of the machine; and as the connection is made at P, the shaft N revolves, winding upon it the chains or ropes R R, connected with the ends of the movable levers S S moving upon the pulley-wheels T T that run upon the guide-rail U on the platform of the machine.

The upper ends of levers S S are pivoted to the pressing-block V, and as the windlass N draws the lower ends of levers S S together, the upper ends raise the pressing-block V upward, and press the hay tightly and compactly into a regular-sized bale.

When the bale is to be removed, by opening the side doors W W, it is hooped, the levers S S are thrown down, the lever J thrown back, the beater raised by the horse-power, and the bale is taken out.

One round of the team of a horse-power is all that is required to draw the levers S S and press the bale complete.

What we claim as our invention, and desire to secure by Letters Patent, is—

The arrangement of the grooved windlass N, provided with the clutch P and forked lever L, in combination with chains R, arms S, and platen V, in the manner herein shown and described, for the purposes set forth.

J. HAM. DAVISON.
T. J. SASHER.

Witnesses:
T. A. DAVISON,
J. H. DAVISON.